CABINET FOR ELECTRONIC EQUIPMENT

Filed Dec. 1, 1954 2 Sheets-Sheet 1

INVENTORS.
VINTON D. CARVER
MARCUS LIAO
BY
George A. Gust
ATTORNEY

Feb. 18, 1958 V. DE VERE CARVER ET AL 2,823,973

CABINET FOR ELECTRONIC EQUIPMENT

Filed Dec. 1, 1954 2 Sheets-Sheet 2

INVENTORS.
VINTON D. CARVER
MARCUS LIAO
BY
George R. Gust
ATTORNEY

United States Patent Office 2,823,973

Patented Feb. 18, 1958

2,823,973

CABINET FOR ELECTRONIC EQUIPMENT

Vinton De Vere Carver and Marcus Liao, Fort Wayne, Ind., assignors to International Telephone and Telegraph Corporation Application December 1, 1954, Serial No. 472,335

3 Claims. (Cl. 312—323)

The present invention relates to a cabinet for electronic equipment, and more particularly to a cabinet mechanism composed of a housing and a chassis which is slidable into and out of the housing.

One embodiment of this invention comprehends a cabinet enclosure which receives a chassis adapted to support any type of electronic equipment. The chassis is supported with respect to the enclosure by means of slide rails whereby the chassis may be conveniently inserted into or pulled completely out of the enclosure. A special feature of the invention resides in the particular construction of the slide rails which are adapted to lock the chassis into any one of three selectable positions with respect to the enclosure. In one position, the chassis is completely withdrawn from the enclosure in substantial parallelism therewith. A second position locates the chassis at right angles with respect to the enclosure, and the third position locates the chassis at a tilting angle with respect to the enclosure.

The operative arrangement of the invention is such that the chassis may be locked in any one of the aforementioned positions such that vibration or sudden movement of the entire assembly will not dislocate the chassis. The slide rails are so arranged that mere manual manipulation of the chassis is all that is required in setting the latter into any one of the three positions.

It is an object of this invention to provide a cabinet assembly wherein a chassis may be moved to any one of three different positions with respect to a cabinet enclosure and conveniently set in any one of those positions.

It is another object of this invention to provide a cabinet slide assembly which is reliable and efficient in operation but which requires a minimum of operating parts.

Other objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described so long as the scope of the appended claims is not violated.

Figure 1:
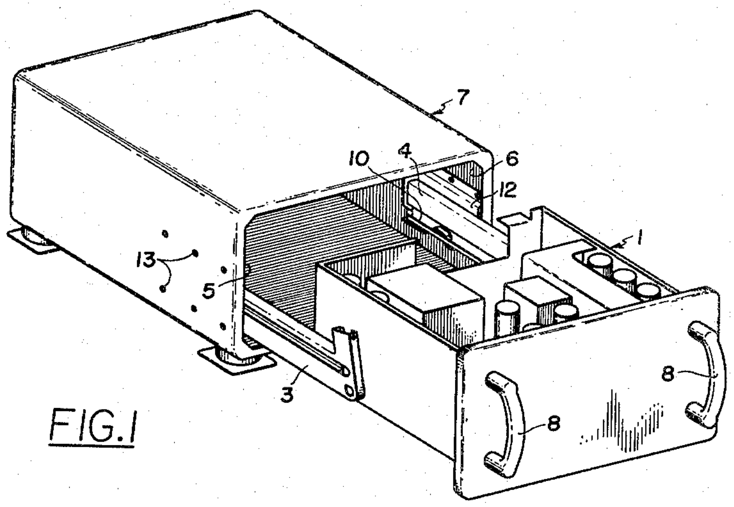
Fig. 1 is a perspective illustration of an embodiment of this invention wherein the chassis is extended to one of three different positions.
Figure 2:
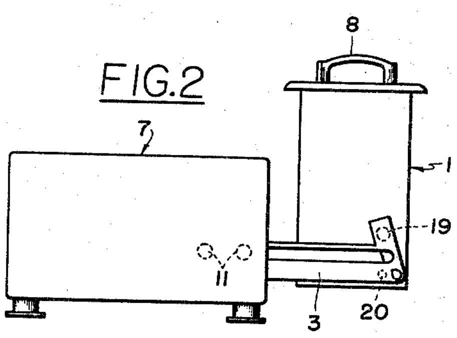
Fig. 2 is a diagrammatic side elevation showing the chassis located at right angles with respect to the enclosure.
Figure 3:
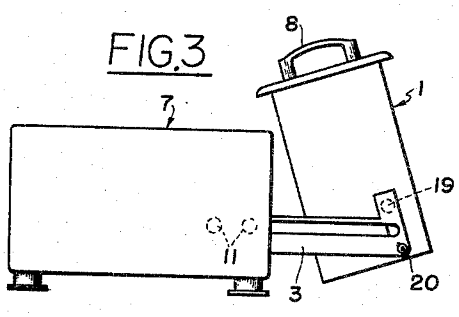
Fig. 3 is another side elevation showing the chassis tilted backwardly with respect to the cabinet enclosure.

Referring to the drawings, and more particularly to Figs. 1, 2 and 3, a conventional chassis 1 is slidably mounted on two slides or slide rails 3 and 4. These rails are in turn slidably mounted on the inside wall surfaces 5 and 6, respectively, of a cabinet enclosure 7. This arrangement is such that the chassis 1 may be pushed into the cabinet 7 whereby the latter is completely enclosed.

With reference to Fig. 2, the chassis 1 may be turned into an upright or vertical position and held there by interlocking structure which will be explained in detail hereinafter. Still further, the chassis 1 may be tilted and secured in the position as illustrated in Fig. 3. By merely grasping the handles 8 on the front of the chassis and exerting a slight lifting and clockwise rotary force, the chassis may be lowered to a horizontal position and then shoved rearwardly on the tracks 3 and 4 into the cabinet 7.

Figure 7:
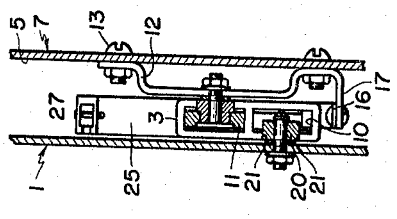
Fig. 7 is an end view of the assembly of Fig. 5 but with the slide rail completely inserted into the cabinet enclosure.
Figure 6:
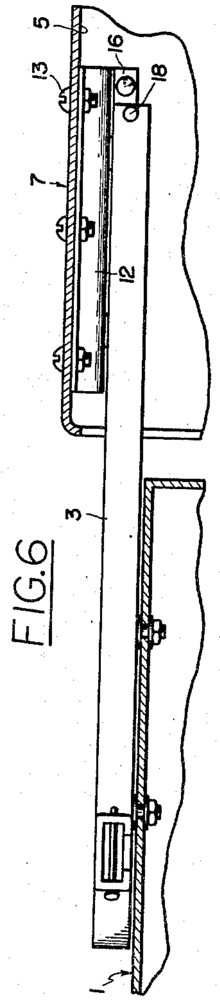
Fig. 6 is a top view of the assembly of Fig. 5.
Figure 5:
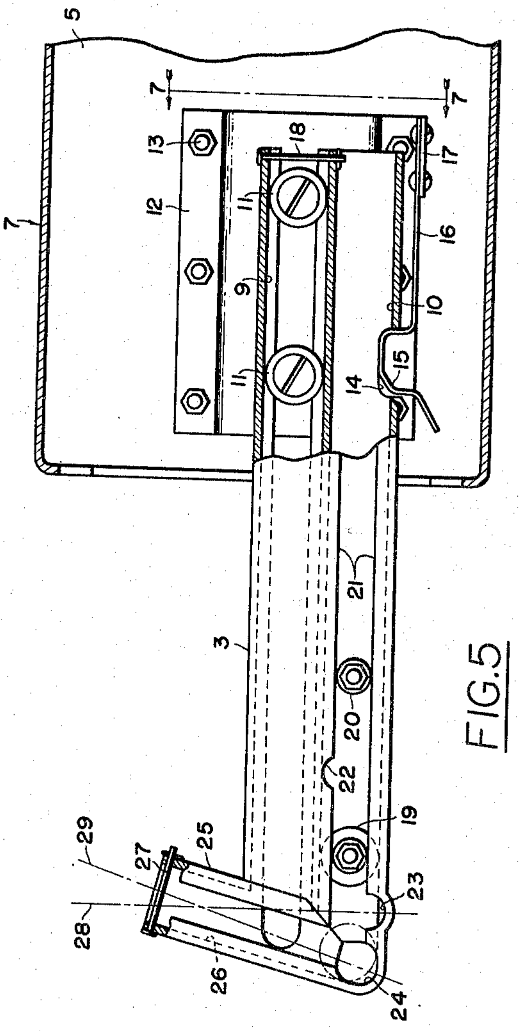
Fig. 5 is a fragmentary side elevation of one slide assembly.

The details of the slides or tracks 3, 4 are more clearly illustrated in Figs. 5, 6 and 7. Since the two slides 3 and 4 are of identical construction, but allochirally related or reversed in configuration, a description of one will suffice for both. The slide 3 is composed of a rigid metallic member having two oppositely facing, longitudinal and parallel extending channel-shaped tracks 9 and 10. These two tracks, as seen more clearly in Fig. 7, are open on opposite sides of the slide 3, whereby the upper track 9 may receive a pair of horizontally spaced rollers 11 which are mounted on a cabinet bracket 12. This bracket 12 is secured to the side wall 5 of the cabinet 7 by means of screws 13 or the like. The lower longitudinal edge of the track 10 is notched or cut out to provide a catch surface 14 which normally receives the detent portion 15 of a preformed catch spring 16. This spring 16 is preferably secured to a laterally extending flange 17 on the bracket 12 by means of rivets or the like. As seen in Fig. 5, by depressing the spring detent 15 out of engagement with the catch surface 14, the slide 3 may be reciprocated on the rollers 11.

In order to prevent the slide 3 (see Fig. 5) from being withdrawn from the rollers 11 in a leftward direction, a limit pin 18 is positioned in the extreme right-hand end of the track 9.

Figure 4:
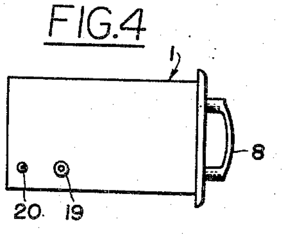
Fig. 4 is a side elevation of the chassis only.

As explained in the preceding, the two tracks 9 and 10 open on opposite lateral sides of the slide 3. This being true, the track 10 opens inwardly of the cabinet enclosure 7, as more clearly seen in Fig. 1, whereby suitable chassis-supporting rollers 19 and 20 may be received therein. The two rollers 19 and 20 are of different sizes, as seen in Figs. 4, 5 and 7, and are preferably mounted on the chassis side near the rear thereof, as seen in Fig. 4. The roller 19 rides in the track 10, whereas the smaller roller 20 rides between edge rails 21 which are provided by the retaining flanges of the larger track 10. The edge rails 21 have three different notches formed therein which correspond to the three different positions of the chassis, as illustrated by Figs. 1, 2 and 3, respectively. The first position notch 22 is formed in the upper edge rail 21, as illustrated in Fig. 5. The second position notch is formed in the lower edge rail 23 near the left-hand end of the slide 3, and the third position notch 24 is formed at the extreme left-hand end of the slide.

Secured to the left-hand end of the main body of the slide 3 is an angular track extension or guide element 25 which extends upwardly and rearwardly as shown. This extension 25 is provided with a track 26 which is of the same size as the lower track 10 and which is positioned in registry therewith. Since the two tracks 10 and 26 are in registry, the chassis roller 19 may be moved longitudinally through track 10 and then into and upwardly through track 26. A limit pin 27 is positioned in the upper end of the track extension 25 to prevent the roller 19 from being withdrawn.

As is now apparent, the chassis 1 is supported on the two slide rails 3 and 4 by means of the chassis rollers 19 and 20. The chassis 1 may be moved longitudinally by reason of the fact that the rollers 19 and 20 ride on the respective tracks 10 and 21.

Assuming the spring detent 15 to be engaged with the catch surface 14, as shown in Fig. 5, the slide 3 is locked in position relative to the cabinet 7. Moving the chassis 1 rearwardly on the tracks 10 and 21 will ultimately move the roller 19 onto the spring detent 15. The detent is depressed out of engagement with the catch surface 14 whereby the entire slide 3 may be moved rearwardly into the cabinet 7 for the full extent of the upper track 9. When the chassis 1 is moved to the rear or right-hand end of the slide 3, and the slide 3 is moved rearwardly or toward the right (Fig. 5) as far as it can travel, the chassis 1 is thereby moved completely inside the cabinet 7 and is enclosed thereby. Mere grasping of the handles 8 and the exertion of a pulling force serves to withdraw the chassis from the cabinet. The limit of this withdrawing movement is determined by engagement of the spring detent 15 with the catch surface 14, and of the roller 20 with the first position stop 22. Fig. 1 illustrates the position of the chassis when the roller 20 is in engagement with the stop 22.

If it is desired to tilt the chassis upright into a truly vertical position, and to retain the chassis against accidental dislodgement, the handles 8 are grasped and drawn upwardly to the position of Fig. 2, at which position roller 20 drops into the second notch 23. The roller 19 is in engagement with the extension track 26. The dashed line 28 is drawn through the centers of the two rollers 19 and 20 and is illustrative of the chassis position.

If it is desired to tilt or lay the chassis 1 backwardly a limited amount in order to make the underside thereof more accessible for inspection and repair, the handles 8 are grasped and lifted upwardly to remove the roller 20 from the notch 23. The roller 20 is then moved forwardly into engagement with the third and last notch 24 whereby the angle of the chassis lies along the dashed line 29.

With the chassis 1 in any one of the three illustrated positions of Figs. 1, 2 and 3, it is securely and automatically locked against accidental dislodgement. This is of especial importance when the equipment is used on moving ships, aircraft, or land vehicles, since the equipment may be serviced in any one of the three positions without any fear of accidental dislodgment.

An additional feature of importance resides in the automatic release of the slide 3 as the chassis 1 is shoved into the cabinet 7 to disengage the catch spring 16.

What is claimed is:

1. In a cabinet mechanism, a slide comprising: an elongated support member having two oppositely facing longitudinally extending parallel channel-shaped tracks, and a third channel-shaped track joining the end of one of said parallel tracks and extending upwardly and rearwardly therefrom, each of said tracks having longitudinally extending parallel and transversely spaced-apart flanges respectively formed on its sides, the upper flange of said one parallel track having a first notch formed therein spaced from the junction of said one of said third tracks, the lower flange of said one parallel track having a second notch formed therein intermediate said first notch and said point of junction, said lower flange of said one parallel track and the flange of said third track joined thereto having a third notch formed at their point of junction.

2. In a cabinet mechanism, a slide comprising: an elongated support member having two oppositely facing longitudinally extending parallel channel-shaped tracks, and a third channel-shaped track joining the end of one of said parallel tracks and extending upwardly and rearwardly therefrom, each of said tracks having longitudinally extending parallel and transversely spaced-apart flanges respectively formed on its sides, the upper flange of said one parallel track having a first notch formed therein spaced from the junction of said one of said third tracks, the lower flange of said one parallel track having a second notch formed therein intermediate said first notch and said point of junction, said lower flange of said one parallel track and the flange of said third track joined thereto having a third notch formed at their point of junction; and a chassis having two spaced-apart rollers mounted on a side thereof, the forward one of said rollers being larger than the other of said rollers; said chassis having a first horizontal movable position with said larger roller located in said one track and said other roller located between the flanges of said one track, said chassis having a second horizontal locked position with said larger roller located at the junction of said one and third tracks and said other roller located in said first notch thereby locking said chassis in said second position, said chassis having a third vertical position with said larger roller located in said third track and said other roller located in said second notch thereby locking said chassis in said third position, said chassis having a fourth rearwardly inclined position with said larger roller located in said third track and said other roller located in said third notch thereby locking said chassis in said fourth position.

3. Cabinet mechanism comprising a case having a vertical side wall; a slide comprising: an elongated support member having two oppositely facing longitudinally extending parallel channel-shaped tracks, and a third channel-shaped track joining the end of one of said parallel tracks and extending upwardly and rearwardly therefrom, each of said tracks having longitudinally extending parallel and transversely spaced-apart flanges respectively formed on its sides, the upper flange of said one parallel track having a first notch formed therein spaced from the junction of said one of said third tracks, the lower flange of said one parallel track having a second notch formed therein intermediate said first notch and said point of junction, said lower flange of said one parallel track and the flange of said third track joined thereto having a third notch formed at their point of junction; and a chassis having two spaced-apart rollers mounted on a side thereof, the forward one of said rollers being larger than the other of said rollers; said chassis having a first horizontal movable position with said larger roller located in said one track and said other roller located between the flanges of said one track, said chassis having a second horizontal locked position with said larger roller located at the junction of said one and third tracks and said other roller located in said first notch thereby locking said chassis in said second position, said chassis having a third vertical position with said larger roller located in said third track and said other roller located in said second notch thereby locking said chassis in said third position, said chassis having a fourth rearwardly inclined position with said larger roller located in said third track and said other roller located in said third notch thereby locking said chassis in said fourth position; said side wall having a pair of spaced-apart rollers respectively mounted thereon and respectively positioned in the other of said parallel tracks for movably supporting said slide; and an elongated leaf spring member having one end secured to said side wall and having a detent portion formed at the other end thereof; said one track having an opening formed in the lower of its sides, said detent portion of said leaf spring engaging said opening when said side is moved outwardly to its extreme position thereby to lock said slide in said extreme position, said other chassis roller engaging said detent thereby to disengage the same from said opening responsive to inward movement of said chassis.

References Cited in the file of this patent

UNITED STATES PATENTS

| | | |
|---|---|---|
| 290,497 | Tucker | Dec. 18, 1883 |
| 1,406,129 | Woltz | Feb. 7, 1922 |
| 2,566,064 | Keim | Aug. 28, 1951 |
| 2,630,364 | Gleason | Mar. 3, 1953 |
| 2,749,201 | Koury et al. | June 5, 1956 |